United States Patent
Mitobe et al.

(10) Patent No.: US 9,556,772 B2
(45) Date of Patent: Jan. 31, 2017

(54) FUEL TANK AND LIQUID TANK CONFIGURATION FOR A WORK VEHICLE

(71) Applicant: KUBOTA CORPORATION, Osaka (JP)

(72) Inventors: Yoshihiro Mitobe, Osaka (JP); Atsushi Hayashi, Osaka (JP); Akihiro Matsuzaki, Osaka (JP); Yuji Imanaga, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 14/716,056

(22) Filed: May 19, 2015

(65) Prior Publication Data

US 2015/0345352 A1    Dec. 3, 2015

(30) Foreign Application Priority Data

May 28, 2014 (JP) .................. 2014-110078

(51) Int. Cl.
*F01N 3/20* (2006.01)
*B60K 15/03* (2006.01)
*F01N 3/08* (2006.01)
*B60K 13/04* (2006.01)

(52) U.S. Cl.
CPC ............ *F01N 3/20* (2013.01); *B60K 13/04* (2013.01); *B60K 15/03* (2013.01); *F01N 3/0842* (2013.01); *F01N 3/206* (2013.01); *B60K 2015/03105* (2013.01); *F01N 2570/14* (2013.01); *F01N 2610/02* (2013.01); *F01N 2610/10* (2013.01); *F01N 2610/1406* (2013.01)

(58) Field of Classification Search
CPC .. F01N 3/206; F01N 2610/02; F01N 2610/10; F01N 2610/1406; B60K 15/03; B60K 2015/03105
See application file for complete search history.

(56) References Cited

U.S. PATENT DOCUMENTS

| | | | |
|---|---|---|---|
| 6,223,526 B1* | 5/2001 | Wissler | B60K 15/03 220/23.87 |
| 2010/0282758 A1* | 11/2010 | Gaden | B60K 15/03 220/565 |
| 2011/0036079 A1* | 2/2011 | Capelle | B60K 15/03 60/298 |
| 2011/0036847 A1* | 2/2011 | Tam | B60K 15/03 220/564 |
| 2011/0232271 A1* | 9/2011 | Haeberer | F01N 3/2066 60/295 |

(Continued)

FOREIGN PATENT DOCUMENTS

JP    2008-273372    11/2008
JP    2009062841 A  *  3/2009
(Continued)

*Primary Examiner* — Audrey K Bradley
(74) *Attorney, Agent, or Firm* — Greenblum & Bernstein, P.L.C.

(57) ABSTRACT

A work vehicle includes an engine, a fuel tank that has a fuel supply inlet and stores engine fuel, and a liquid tank that has a liquid supply inlet and stores purification liquid that is used in purification of engine exhaust gas. The liquid tank is protected by the fuel tank so that the liquid tank is not directly exposed to hot air from the engine.

11 Claims, 6 Drawing Sheets

(56) References Cited

U.S. PATENT DOCUMENTS

| | | | |
|---|---|---|---|
| 2012/0067660 A1* | 3/2012 | Kashu | B60K 13/04 |
| | | | 180/296 |
| 2012/0174566 A1* | 7/2012 | Yamashita | B60K 13/04 |
| | | | 60/295 |
| 2013/0000281 A1 | 1/2013 | Merchant et al. | |
| 2014/0318882 A1 | 10/2014 | Sawada | |
| 2015/0167274 A1 | 6/2015 | Harada et al. | |

FOREIGN PATENT DOCUMENTS

| | | |
|---|---|---|
| JP | 2013-151185 | 8/2013 |
| JP | 5449518 B1 | 3/2014 |
| JP | 5501534 B1 | 5/2014 |

\* cited by examiner

FUEL TANK AND LIQUID TANK CONFIGURATION FOR A WORK VEHICLE

CROSS-REFERENCE TO RELATED APPLICATIONS

The present application claims priority under 35 U.S.C. §119 of Japanese Application No. 2014-110078, filed on May 28, 2014, the disclosure of which is expressly incorporated by reference herein in its entirety.

BACKGROUND OF THE INVENTION

1. Field of the Invention

The present invention relates to a work vehicle that includes a tank that stores a liquid for purifying exhaust gas by reduction.

2. Description of Related Art

An exhaust device that purifies exhaust gas is mounted in a work vehicle such as a tractor in order to comply with regulations on exhaust gas emission of nitrogen oxides and the like, which have become more stringent in recent years. In this case, it is proposed that, in order to efficiently remove nitrogen oxides in exhaust gas by reduction, a reductant solution such as urea is injected into the exhaust gas. For this purpose, it is necessary to provide a tank storing such a reductant solution in a work vehicle.

In a work vehicle disclosed in Japanese Patent Laid-Open Publication No. 2013-151185, a urea water solution tank is mounted via brackets, mount brackets and the like to a cylinder block 7 of an engine and a transmission case, the urea water solution tank storing a urea water solution as a selective reduction nitrogen oxide catalyst to be sprayed into exhaust gas in order to remove nitrogen oxides in the exhaust gas. In this configuration, the urea water solution tank is arranged using a space between a vehicle body and the ground. Therefore, there is an advantage from a viewpoint of space utilization. However, the tank is exposed to hot air from the engine, and this is disadvantageous for the urea water solution that expands when heated. Further, when an amount of the urea water solution in the urea water solution tank is decreased, the urea water solution must be supplied. However, a supply structure of the urea water solution tank is not described in Japanese Patent Laid-Open Publication No. 2013-151185.

In a vehicle according to Japanese Patent Laid-Open Publication No. 2008-273372, a urea water solution inlet connecting to a urea tank and a fuel inlet connecting to a fuel tank are arranged close to each other and a common cap that covers both inlets is provided. The urea water solution is consumed at a slower rate as compared to the fuel. Therefore, rather than supplying the urea water solution alone, it is more likely that the urea water solution is also supplied when the fuel is supplied after having performed fuel supply several times. Therefore, that the urea water solution inlet and the fuel inlet connecting to the fuel tank are close to each other is advantageous to workability when supplying both the urea water solution and the fuel. However, measures are necessary to prevent one liquid (fuel or urea water solution) from being mistakenly supplied into the tank for the other liquid and to prevent one liquid from being scattered into the inlet for the other liquid when liquid supply is performed. Further, also in Japanese Patent Laid-Open Publication No. 2008-273372, the urea water solution tank, or at least a bottom surface of the urea water solution tank, is exposed to a space below a vehicle body, and no measures are taken against hot air from an engine.

SUMMARY OF THE INVENTION

In view of the above-described circumstances, the present invention provides a work vehicle having a structure in which a liquid tank storing a purification liquid used in exhaust gas purification is protected from hot air and the like generated by an engine and the like.

A work vehicle according to the present invention includes an engine, a fuel tank that has a fuel supply inlet and stores engine fuel, and a liquid tank that has a liquid supply inlet and stores purification liquid that is used in purification of engine exhaust gas. The liquid tank is protected by the fuel tank so that the liquid tank is not directly exposed to hot air from the engine.

Stringent safety regulations are applied to a fuel tank. Therefore, the fuel tank itself has material and a structure strong against heat and foreign substances. According to the configuration of the present invention, in view of the toughness of the fuel tank, the fuel tank is used as a so-called breakwater so that the liquid tank is not directly exposed to hot air from the engine. Therefore, according to the present invention, by a simple structural modification, a work vehicle can be provided that allows a urea tank to be protected from hot air generated by the engine and the like.

In one aspect the present invention, the liquid tank extends so as to be close to an outer-side side surface of the fuel tank in a transverse direction of a vehicle body. In other words, the liquid tank is close to a side surface of the fuel tank on an opposite side from a side surface opposing the engine. As a result, the liquid tank is hidden behind the fuel tank, and hot air that is generated by the engine and the like and flows to surrounding devices of the engine can be satisfactorily blocked by the fuel tank.

In another aspect of the present invention, the fuel tank includes a main tank part that extends along a side of the engine in a front-rear direction of the vehicle body, and an extension tank part that extends forward and outward from a front end of the main tank part; the liquid tank includes a columnar sub tank chamber, and a main tank chamber that extends in a lateral direction from the sub tank chamber; and a recess is formed on the extension tank part of the fuel tank, the recess accommodating an engine-side side surface and a bottom surface of the main tank chamber of the liquid tank. In this configuration, not only the side surface but also the bottom surface of the liquid tank is protected by the fuel tank. As a result, hot air that, after being generated by the engine and the like, hits the ground once and returns to the vehicle body side, is also blocked by the fuel tank, and thus protection of the liquid tank is enhanced.

Usually, considering that the liquid is also supplied to the liquid tank when fuel is supplied after having performed fuel supply several times, to simplify the liquid supply process, it is convenient that the fuel supply inlet and the fuel supply inlet of the liquid tank be as close to each other as possible. In another aspect of the present invention, a fuel supply tube having the fuel supply inlet is provided in a front end region of the extension tank part of the fuel tank, and a liquid supply tube having the liquid supply inlet is provided in a front end region of the main tank chamber of the liquid tank. In this case, when the fuel supply tube and the liquid supply tube are arranged adjacent to each other, efficiency of space utilization by arranging the fuel supply tube and the liquid supply tube adjacent to each other is improved. Further, when a positional relationship is adopted in which a fuel supply surface of the fuel supply inlet and a liquid supply surface of the liquid supply inlet intersect each other, a relative angle is formed between the fuel supply surface of the fuel supply inlet and the liquid supply surface of the liquid supply inlet, and it is less likely that one liquid is scattered into the tank for the other liquid when liquid supply is performed.

A purification liquid such as urea (water solution) that purifies exhaust gas has a property that the liquid expands when temperature rises. Therefore, when the liquid is supplied until the liquid tank is full, liquid that has expanded due to a slight rise in temperature may cause some kind of disadvantage. Therefore, in another aspect of the present invention, a height level of an upper wall of the sub tank chamber is equal to or higher than the liquid supply surface of the liquid supply inlet, a height level of an upper wall of the main tank chamber is lower than that of the upper wall of the sub tank chamber, and, when the liquid tank is full during liquid supply, a space allowing expansion of the stored purification liquid is formed between the upper wall of the sub tank chamber and a liquid level. In this configuration, even when the liquid is supplied through the liquid supply inlet of the liquid supply tube that is provided on the main tank chamber and the main tank chamber is full, the space exists between the upper wall of the sub tank chamber and the liquid level. Therefore, this space becomes an expansion margin of the liquid and trouble in the liquid tank can be avoided.

When the purification liquid stored in the main tank chamber is used until the main tank chamber is empty, and when purification liquid is supplied to the liquid tank where high temperature returning liquid accumulates, a temperature of the newly supplied purification liquid rapidly rises. Therefore, in another aspect of the present invention, a bottom surface of the main tank chamber is formed to be higher than a bottom surface of the sub tank chamber in order to form a liquid reservoir in a bottom region of the sub tank chamber. According to this configuration, even when the main tank chamber becomes empty, purification liquid remains in the sub tank chamber. Therefore, by mixing this remaining purification liquid with newly supplied purification liquid, the situation of the temperature of the newly supplied purification liquid rapidly rising is avoided.

Depending on a work environment, especially when working in the summer, it is not uncommon that the work vehicle itself is exposed to unexpectedly high temperatures. Therefore, it is preferable that the purification liquid stored in the liquid tank be forcibly cooled. Therefore, in another aspect of the present invention, a heat exchanger using an engine coolant as a medium is housed in the sub tank chamber. As a result, when the engine is operating, the purification liquid stored in the liquid tank is stably cooled by the engine coolant.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
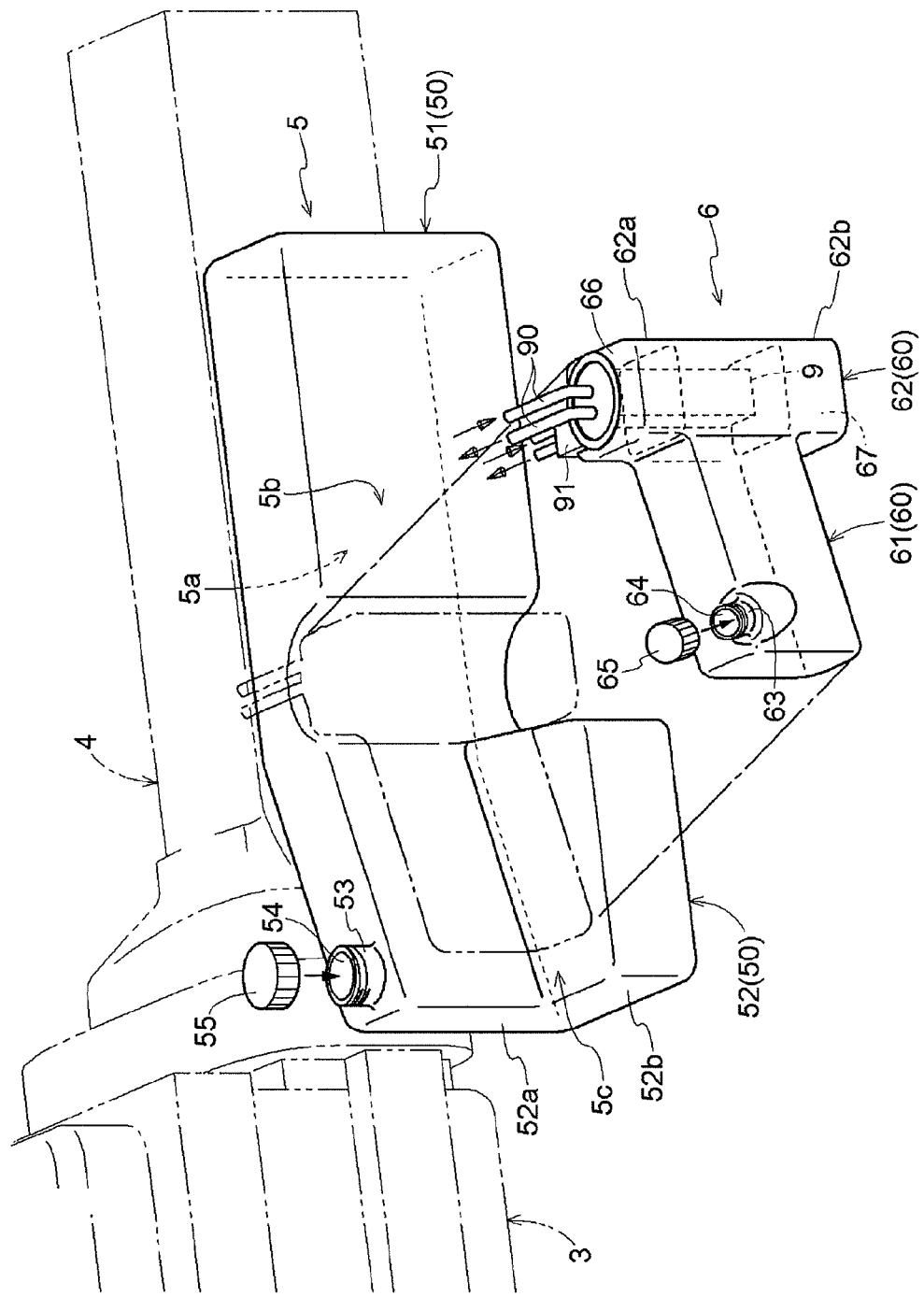
FIG. 1 is a schematic diagram describing a basic relationship between a fuel tank and a liquid tank that are adopted in a work vehicle according to the present invention.

Before describing specific embodiments of a work vehicle according to the present invention, a basic relationship between a fuel tank and a liquid tank that characterize the present invention is described with reference to FIG. 1. A fuel tank 5 illustrated in FIG. 1 is a tank that stores fuel that is used to drive an engine 3. A liquid tank 6 is a tank that stores a reductant solution such as urea for purifying exhaust gas of the engine 3. The fuel tank 5 is arranged so as to extend along the engine 3 or a transmission 4, or along both sides of the engine 3 and the transmission 4, the transmission 4 changing a speed of an engine output. The fuel tank 5 at least has a first side surface 5a that opposes the engine 3 or the transmission 4 or both the engine 3 and the transmission 4, and a second side surface 5b that is on an opposite side from the first side surface 5a (an outer side in a transverse direction of the work vehicle). A tank main body 60 of the liquid tank 6 has a side surface that has a projected area that is the same size as or smaller than the second side surface 5b of the fuel tank 5. As a result, when the liquid tank 6 is arranged close to the second side surface 5b of the fuel tank 5 (here meaning that the liquid tank 6 and the fuel tank 5 are arranged close to each other or spaced slightly apart from each other), hot air from the engine 3 is blocked by the fuel tank 5 and does not directly hit on the side surface of the liquid tank 6 on the engine 3 side.

A tank main body 50 of the fuel tank 5 illustrated in FIG. 1 at least has a main tank part or section 51 and an extension tank part or section 52 that further extends from the main tank part 51 toward the engine 3 side (front side). The tank main body 60 of the liquid tank 6 has a rectangular parallelepiped main tank chamber 61 and a cylindrical sub tank chamber 62 that communicatively connects to an end part of the main tank chamber 61. An upper part 62a of the sub tank chamber 62 protrudes upward above an upper surface of the main tank chamber 61 and creates an upper space. A lower part 62b of the sub tank chamber 62 protrudes downward below a bottom surface of the main tank chamber 61 and creates a lower space.

As is apparent from FIG. 1, the extension tank part 52 of the fuel tank 5 includes a vertical part 52a that is positioned on the engine 3 side and a horizontal part 52*b* that extends from a lower part of the vertical part 52*a* in a direction away from the engine 3 (outward in the transverse direction of the work vehicle). That is, the extension tank part 52 has an L-shaped cross section. On the second side surface 5*b* side, a recess 5*c* is formed bounded by a vertical wall of the vertical part 52*a* and a horizontal wall of the horizontal part 52*b*. The recess 5*c* has a shape adapted to a shape of the main tank chamber 61 of the liquid tank 6 so that the main tank chamber 61 of the liquid tank 6 enters into the recess 5*c*. As a result, the bottom surface side of the main tank chamber 61 of the liquid tank 6 is also covered and protected by the extension tank part 52 of the fuel tank 5. Further, in the example illustrated in FIG. 1, on the second side surface 5*b* of the fuel tank 5, a recess capable of accommodating at least a portion of the sub tank chamber 62 of the liquid tank 6 is provided extending in a vertical direction.

A fuel supply tube or neck 53 is formed on an upper surface of a front end of the extension tank part 52. A fuel supply cap 55 is provided for closing an opening (fuel supply surface) of the fuel supply tube 53, the opening acting as a fuel supply or filling inlet 54. A liquid supply tube or neck 63 is formed on an upper surface of a front end of the main tank chamber 61 of the liquid tank 6. A liquid supply cap 65 is provided for closing an opening (liquid supply surface) of the liquid supply tube 63, the opening acting as a liquid supply or filling inlet 64. Although it is only schematically illustrated using a two-dot dashed line in FIG. 1, in a state in which the liquid tank 6 is assembled to and/or partially nested with the fuel tank 5, the fuel supply tube 53 and the liquid supply tube 63 are adjacent to each other. While the fuel supply tube 53 is substantially vertically provided, the liquid supply tube 63 is provided obliquely so that the liquid supply inlet 64 is away from the fuel supply tube 53. A normal of the fuel supply surface of the fuel supply inlet 54 and a normal of the liquid supply surface of the liquid supply inlet 64 extend in directions in which a distance therebetween increases. Said in another way, a center axis of each of the necks 54 and 64 are oriented in a non-parallel or angled orientation relative to one another.

Inside the sub tank chamber 62 of the liquid tank 6, a heat exchanger 9 using an engine coolant as a medium is housed, and a heat exchange pipe 90 that is connected to an engine cooling flow passage protrudes from a ceiling wall of the upper part 62*a* of the sub tank chamber 62. On the ceiling wall, although not illustrated in FIG. 1, a reserve device 91 is further provided that supplies the reductant solution stored in the liquid tank 6 to a liquid injector (not illustrated in the drawings) that is provided in an exhaust gas flow passage. A reciprocating flow passage is provided between the liquid injector and the reserve device 91.

The upper part 62*a* of the sub tank chamber 62 protrudes above an upper surface of the main tank chamber 61. Therefore, an upper surface of the upper part 62*a* that configures the sub tank chamber 62 (that is, an inner surface of the ceiling wall of the sub tank chamber 62) is at a position higher than the upper surface of the main tank chamber 61 (that is, an inner surface of a ceiling wall of the main tank chamber 61). That is, the upper part 62*a* of the sub tank chamber 62 creates the upper space that has a height level higher than the main tank chamber 61. Therefore, even in a state in which liquid is supplied from the liquid supply inlet 64 and the main tank chamber 61 becomes full so that the liquid is about to overflow from the liquid supply inlet 64, there exists a space between an inner surface of an upper wall in the upper part 62*a* of the sub tank chamber and a liquid level. This space becomes an expansion margin of the liquid and thus even when the liquid is heated to a high temperature due to some reason and expands, trouble or potential problems in the liquid tank is avoided.

Further, the space created by the lower part 62*b* of the sub tank chamber 62 acts as a liquid reservoir 67 so that a small amount of the reductant solution remains even when the main tank chamber 61 is empty. For this reason, the bottom surface of the main tank chamber 61 is provided slightly inclined so that the reductant solution flows down to the liquid reservoir 67.

Figure 2:
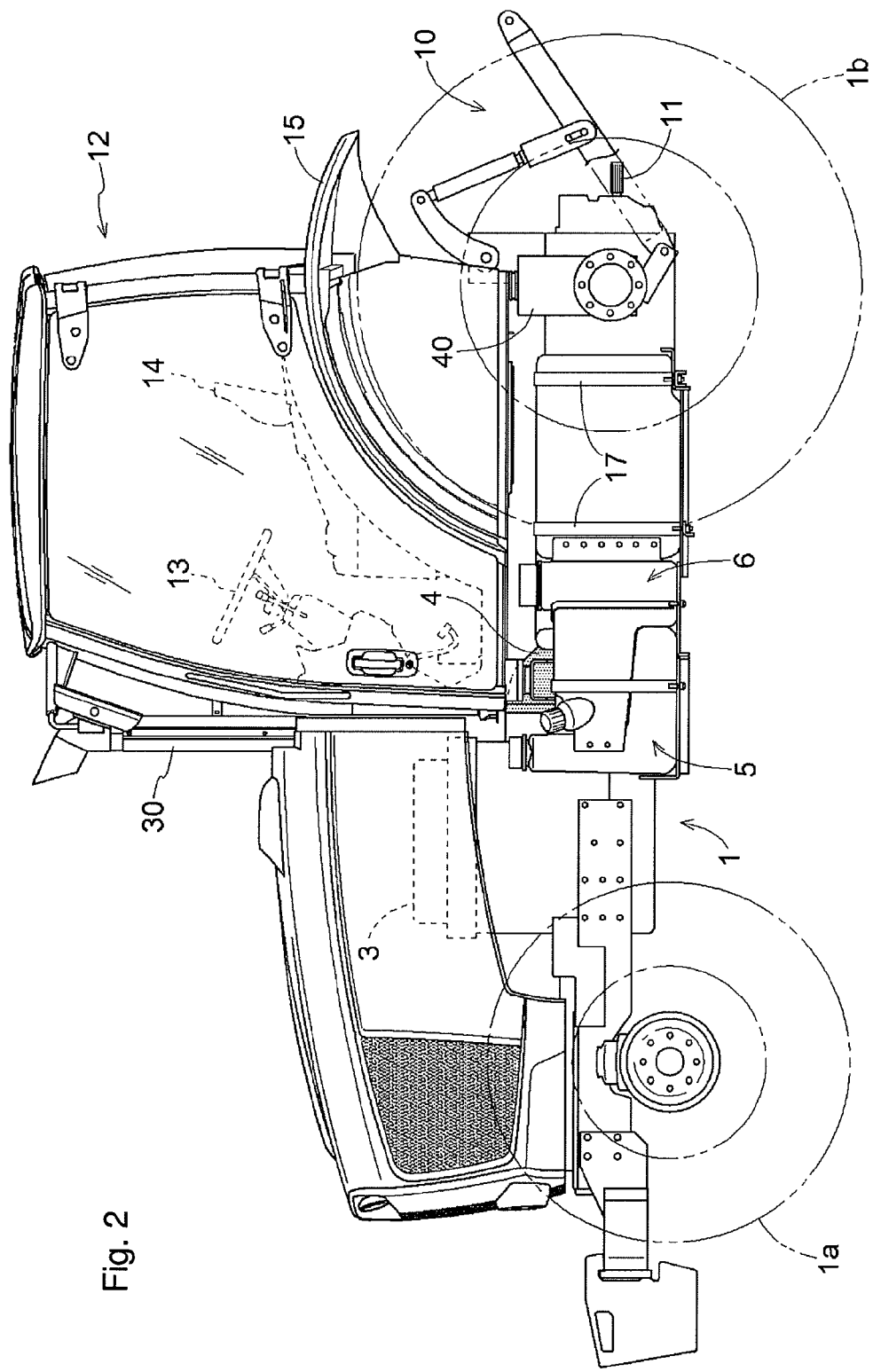
FIG. 2 is a side view of a tractor illustrating an embodiment of the work vehicle according to the present invention.

Next, a specific embodiment of the work vehicle according to the present invention is described with reference to the drawings. FIG. 2 is a side view of a tractor that is an example of the work vehicle. As illustrated in FIG. 2, the engine 3 is arranged at a front part of a vehicle body 1 of the tractor that is supported by front wheels 1*a* and rear wheels 1*b*. The transmission 4 is arranged to the rear of the engine 3. On a rear end of the vehicle body 1, a link mechanism 10 is equipped that vertically movably supports a work apparatus (not illustrated in the drawings). The tractor is of a four-wheel drive type. Power of the engine 3 is transmitted to the front wheels 1*a* and the rear wheels 1*b* via a travel speed change device that configures the transmission 4. Further, the power of the engine 3 is similarly transmitted to a PTO shaft 11 via a PTO speed change device that configures the transmission 4.

A cabin 12 that forms an operating unit behind the engine 3 is mounted on the vehicle body 1. A steering wheel 13 performing a steering operation of the front wheels 1*a* is arranged at a front part of the operating unit and a driver seat 14 is arranged at a rear part of the operating unit. Rear wheel fenders 15 are provided on left and right outer sides in the transverse direction at the rear part of the cabin 12. The fuel tank 5 and the liquid tank (hereinafter referred to as a urea tank) 6 that stores urea (urea water solution) as the reductant solution are arranged at a height substantially the same as the transmission 4 below the cabin 12. The fuel tank 5 and the urea tank 6 are attached using fixing brackets 17 to a support member that is coupled to the vehicle body 1 or the transmission 4. The fuel tank 5 and the urea tank 6 in this embodiment also adopt the basic relationship between the fuel tank 5 and the liquid tank 6 that is described using FIG. 1, and all the structural features and operation effects described therein are also applicable to the fuel tank 5 and the urea tank 6 in the following embodiment.

Figure 3:
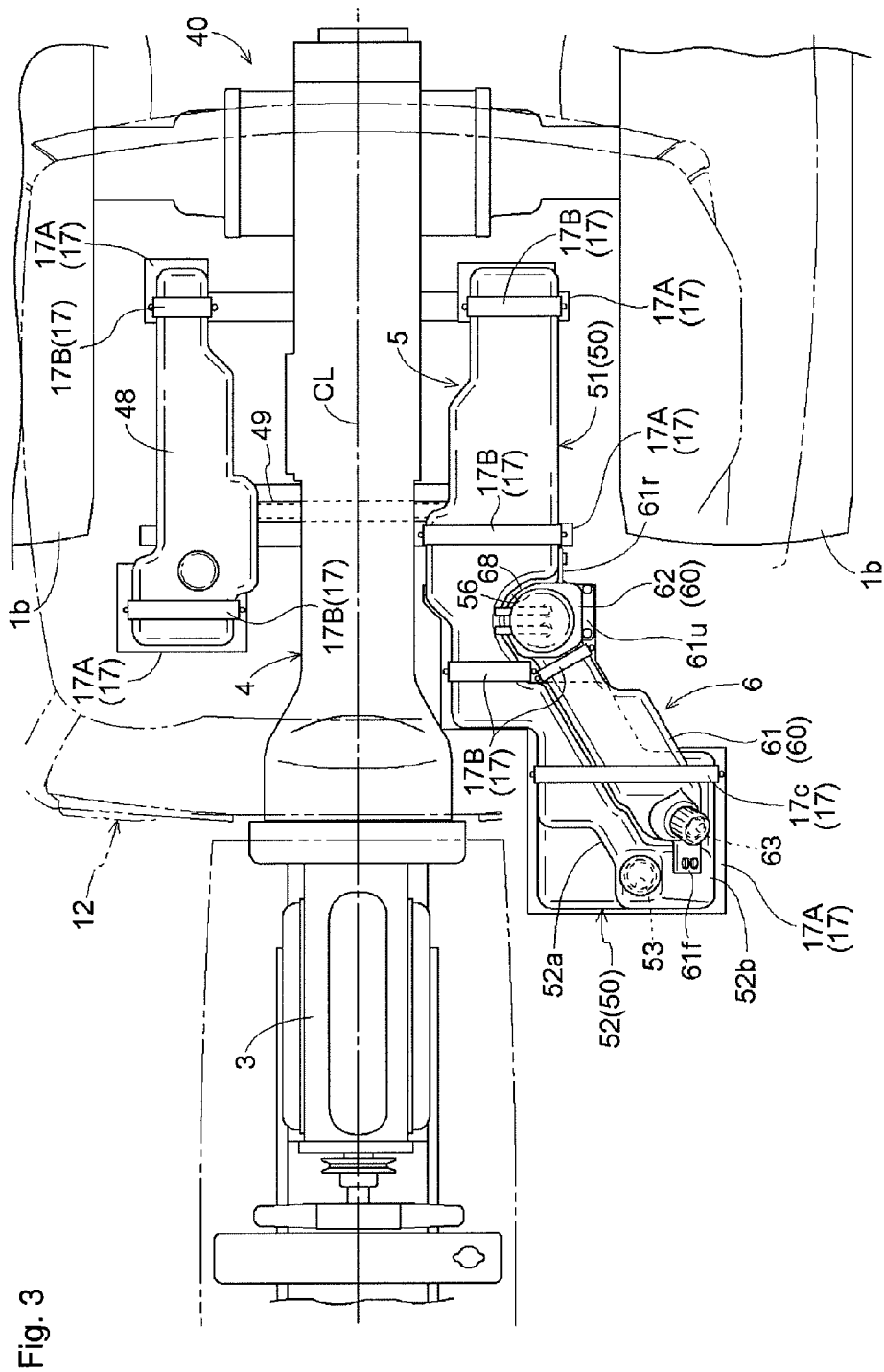
FIG. 3 is a plan or top view illustrating an engine, a transmission, a fuel tank and a urea tank of the tractor.

FIG. 3 is a plan view illustrating the engine 3, the transmission 4, the fuel tank 5 and the urea tank 6. As is apparent from FIG. 3, the engine 3 and the transmission 4 are arranged on a center line CL that extends in the front-rear direction of the tractor, and a rear axle case 40 extends in the transverse direction in a rear region of the transmission 4. The fuel tank 5 in this embodiment includes an auxiliary tank part 48 positioned on a right side of the center line CL, in addition to, as the tank main body 50, the main tank part 51 and the extension tank part 52, the main tank part 51 being positioned on a left side of the center line CL in a forward direction of the tractor, and the extension tank part 52 obliquely extending from the main tank part 51 in a forward and outward direction. The auxiliary tank part 48 is communicatively connected to the main tank part 51 via a communicating pipe 49 that traverses a lower side of the transmission 4. The main tank part 51 and the auxiliary tank part 48 extend from immediately forward of the rear axle case 40 between the transmission 4 and the rear wheels 1*b*. A front end of the auxiliary tank part 48 further protrudes forward from front ends of the rear wheels 1*b*. The main tank part 51 also further extends forward from the front ends of the rear wheels 1b and then transitions to the extension tank part 52.

Figure 4:
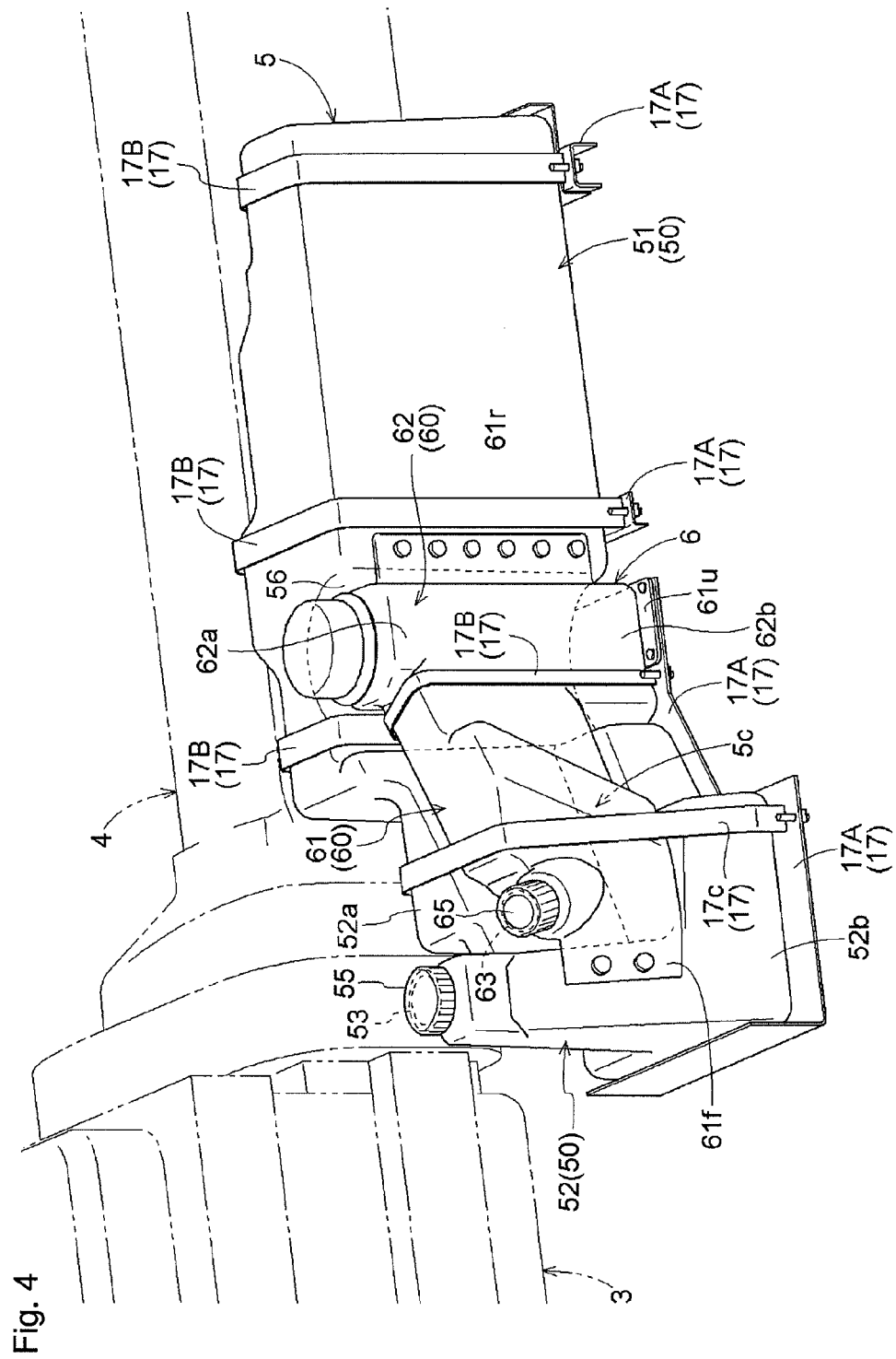
FIG. 4 is a perspective view illustrating the fuel tank and the urea tank in a state in which the fuel tank and the urea tank are assembled.

As is apparent from FIGS. 3 and 4, the urea tank 6 is arranged so as to be embraced by the outer-side side surface of the extension tank part 52. In a plan view, the urea tank 6 obliquely extends from a transverse direction position, which is located in front of the rear wheels 1b and between the rear wheels 1b and the transmission 4, to a position near a width direction center of the rear wheels 1b. As a result, an inner edge of the urea tank 6 closest to the center line CL of the tractor is closer to the center line CL than an inner edge of the rear wheels 1b. However, an outer edge of the urea tank 6 farthest from the center line CL of the tractor does not exceed an outer edge of the rear wheels 1b.

Figure 5:
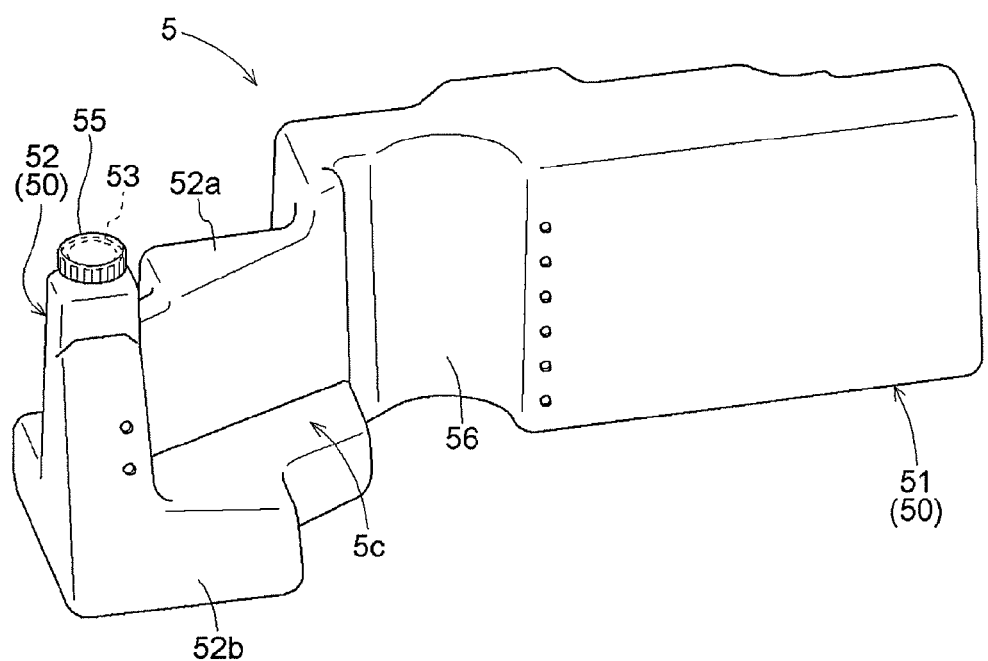
FIG. 5 is a perspective view illustrating the fuel tank in isolation.
Figure 6:
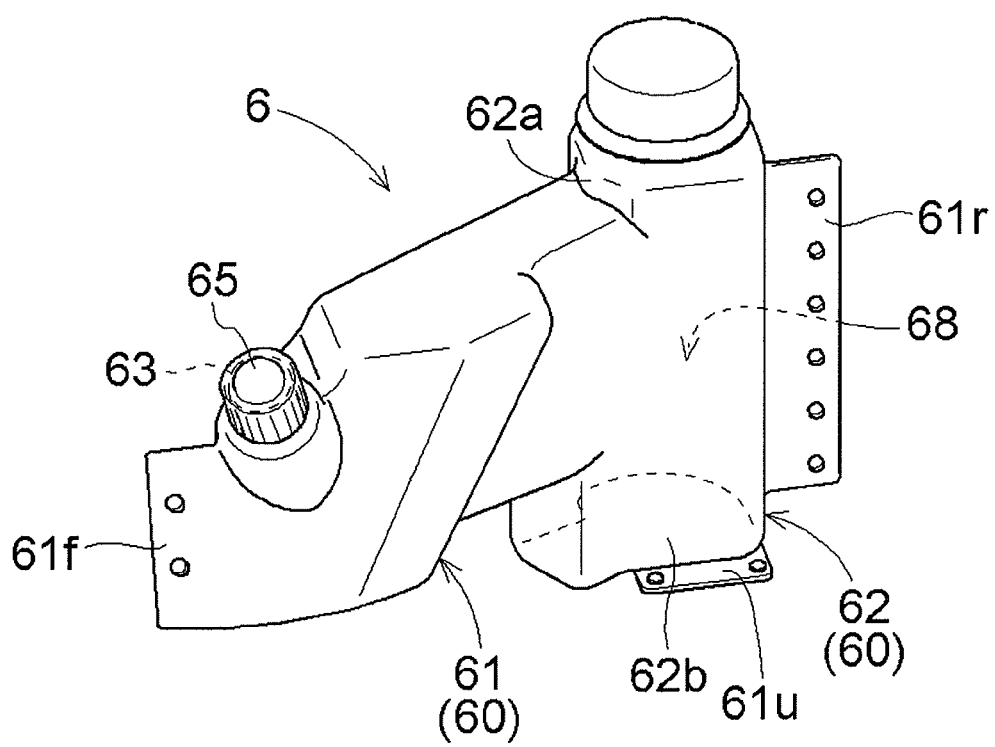
FIG. 6 is a perspective view illustrating the urea tank in isolation.

The fuel tank 5 is illustrated in isolation in FIG. 5, and the urea tank 6 is illustrated in isolation in FIG. 6. As illustrated in FIGS. 3, 4 and 6, the tank main body 60 of the urea tank 6 includes the main tank chamber 61 that has an elongated rectangular cross section and the sub tank chamber 62 that has a square cross section and a height higher than that of the main tank chamber 61. An end of the main tank chamber 61 is connected to a central region of a side surface of the sub tank chamber 62, and an inner space of the main tank chamber 61 and an inner space of the sub tank chamber 62 are communicatively connected with each other. The upper part 62a of the sub tank chamber 62 acts as a base for a device mounter 66 (see FIG. 1) for mounting the heat exchanger 9 and the urea reserve device 91, the upper part 62a extending upward from a connection portion between the sub tank chamber 62 and the main tank chamber 61. The lower part 62b of the sub tank chamber 62 has a bottom surface positioned below the bottom surface of the main tank chamber 61 in order to create, in the lower part 62b, the lower space that acts as the liquid reservoir 67 (see FIG. 1), the lower part 62b extending downward from the connection portion between the sub tank chamber 62 and the main tank chamber 61. The lower part 62b is configured to have a cross section larger than that of the upper part 62a. This increases a volume of the liquid reservoir 67 and contributes to stability of the urea tank 6. The liquid supply tube 63 is provided on the upper surface of the end region of the main tank chamber 61 on the opposite side from the sub tank chamber 62. The liquid supply cap 65 is attached to a front end of the liquid supply tube 63. As is apparent from FIGS. 2 and 3, the liquid supply tube 63 obliquely extends upward, forward and outward.

The tank main body 50 of the fuel tank 5 excluding the auxiliary tank part 48 is illustrated in FIGS. 3-5. The main tank part 51 has a substantially rectangular parallelepiped shape. In order to avoid interference with components of the tractor, the side surface of the extension tank part 52 on the center line CL side of the tractor has an irregular shape. The recess 5c bounded by the vertical wall and the horizontal wall is formed on the outer side end surface of the extension tank part 52. The recessed shape created by the recess 5c adapts to the shape of the main tank chamber 61 of the urea tank 6. The main tank chamber 61 is fitted to the recess 5c. The main tank chamber 61 is embraced and supported by the extension tank part 52. Further, an outer-side side surface of a connection region of the main tank part 51, the connection region connecting to the extension tank part 52, is formed as an inwardly-concave curved surface 56. Further, a side surface of the sub tank chamber 62 of the urea tank 6 on the side opposing the fuel tank 5 is also formed as a convex curved surface 56 corresponding to the curved surface 68. By fitting the curved surface 68 of the urea tank 6 to the curved surface 56 of the fuel tank 5, bonding, fitting or partially nesting between the fuel tank 5 and the urea tank 6 is realized, in which the fuel tank 5 and the urea tank 6 are positionally regulated with respect to each other.

In order to securely couple the fuel tank 5 and the urea tank 6 to each other, on two ends of the urea tank 6, specifically, on a front end side of the main tank chamber 61, a rear end side of the sub tank chamber 62 and on a lower end side of the sub tank chamber 62, mounting tongue pieces 61f, 61r, 61u are formed on which a plurality of through holes are formed (see FIG. 6). Further, anchor screw holes are provided at positions corresponding to the through holes of the mounting tongue pieces 61f and 61r in a state in which the fuel tank 5 and the urea tank 6 are combined. The fuel tank 5 and the urea tank 6 can be screw-fixed to each other using fixation screws or the like.

A front-outer side corner of the extension tank part 52 protrudes upward and creates the fuel supply tube 53 that is substantially upright. As is apparent from FIG. 2, in the state in which the fuel tank 5 and the urea tank 6 are combined, an apex height of the fuel supply tube 53 is higher than an apex height of the liquid supply tube 63.

As illustrated in FIGS. 2-4, in order to fix the fuel tank 5 and urea tank 6 on the vehicle body 1, fixing brackets 17 are provided. The fixing brackets 17 include fixing members 17A that are fixed to a frame that configures the vehicle body 1 and to the transmission 4, and holding members 17B that are attached to the fixing members 17A and wrap and hold the fuel tank 5 or the urea tank 6 or both. That is, the fixing brackets 17 include fuel tank fixing brackets 17a that fix only the fuel tank 5, urea tank fixing brackets 17b that fix only the urea tank 6, and common fixing brackets 17c that simultaneously fix both the fuel tank 5 and the urea tank 6.

In FIG. 2, only a muffler 30 portion of the exhaust system is illustrated. However, a urea injector (not illustrated in the drawings) is arranged in an exhaust pipe that extends from the engine 3 to the muffler 30. Urea is supplied to the urea injector from the urea reserve device 91 that is installed on the urea tank 6. Further, a DPF (Diesel Particulate Filter) (not illustrated in the drawings) is also arranged in the exhaust pipe, and contributes to purification of exhaust gas.

Other Non-Limiting Embodiments (1) In the above-described embodiment, the reductant solution stored in the liquid tank 6 is urea. However, the reductant solution may be a reductant solution other than urea as long as the reductant solution is a reductant solution that removes NOx in exhaust gas by reduction. Further, a plurality of reductant solutions including urea may be used.
(2) In the above-described embodiment, the bottom surface and the engine-side side surface of the liquid tank 6 are covered by or resting on a portion of the fuel tank 5. However, it is also possible to adopt an embodiment in which a pocket-like recess is formed in the fuel tank 5 and, other than an opening surface for attaching the liquid tank 6, the liquid tank 6 is covered by the fuel tank 5. Further, it is also possible to adopt an embodiment in which only a surface opposing the hot air flowing from the engine 3 and the like is covered by the fuel tank 5.
(3) In the above-described embodiment, the liquid tank 6 is arranged on the left side in the forward direction of the work vehicle. However, the liquid tank 6 may also be arranged on the right side or on both sides.
(4) In the above-described embodiment, the tractor is used as the work vehicle. However, without being limited to this, the fuel tank 5 and the liquid tank 6 can also be arranged in similar modes in work vehicles such as a combine harvester and a construction machine.

The present invention is applicable to a work vehicle that includes a fuel tank and a liquid tank that stores a purification liquid used in exhaust gas purification.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A work vehicle comprising:
an engine;
a fuel tank that has a fuel supply inlet and stores engine fuel; and
a liquid tank that has a liquid supply inlet and stores purification liquid used in purification of engine exhaust gas,
wherein the liquid tank is associated with the fuel tank so as to be protected by the fuel tank, whereby the liquid tank is not directly exposed to hot air from the engine,
wherein the fuel tank comprises:
a main tank section that extends along a side of a transmission along a front-rear direction of a vehicle body; and
an extension tank section that extends forward and outward from the main tank section,
the liquid tank comprises:
a columnar-shaped sub-tank chamber; and
a main tank chamber that extends in a lateral direction from said sub-tank chamber, and
the extension tank section comprises a recessed section adapted to at least partially receive therein or accommodate a portion of the main tank chamber of the liquid tank,
wherein the work vehicle further comprises a heat exchanger adapted to receive engine coolant and being arranged inside the sub tank chamber.

2. A work vehicle comprising:
an engine;
a fuel tank that has a fuel supply inlet and stores engine fuel; and
a liquid tank that has a liquid supply inlet and stores purification liquid used in purification of engine exhaust gas,
wherein the liquid tank is associated with the fuel tank so as to be protected by the fuel tank, whereby the liquid tank is not directly exposed to hot air from the engine, and wherein the fuel supply inlet and liquid supply inlet are oriented along different directions,
wherein the liquid tank is arranged adjacent to an outerside side surface of the fuel tank,
wherein the fuel tank comprises:
a main tank section that extends along a side of a transmission along a front-rear direction of a vehicle body; and
an extension tank section that extends forward and outward from the main tank section, and
wherein the liquid tank comprises:
a columnar-shaped sub-tank chamber; and
a main tank chamber that extends in a lateral direction from said sub-tank chamber, and
the extension tank section comprises a recessed section adapted to at least partially receive therein or accommodate a portion of the main tank chamber of the liquid tank,
the work vehicle further comprising a heat exchanger adapted to receive engine coolant and being arranged inside the sub tank chamber.

3. The work vehicle according to claim 2, wherein the liquid tank is at least partially nested into the fuel tank.

4. The work vehicle according to claim 2, wherein
the fuel supply inlet is arranged in a front area or region of an extension tank section of the fuel tank, and
the liquid supply inlet is arranged in a front area or region of a main tank chamber of the liquid tank.

5. The work vehicle according to claim 4, wherein the fuel supply inlet and liquid supply inlet are arranged adjacent each other.

6. A work vehicle comprising:
an engine;
a fuel tank that has a fuel supply inlet and stores engine fuel; and
a liquid tank that has a liquid supply inlet and stores purification liquid used in purification of engine exhaust gas,
wherein the liquid tank is associated with the fuel tank so as to be protected by the fuel tank, whereby the liquid tank is not directly exposed to hot air from the engine,
wherein the fuel tank comprises:
a main tank section that extends along a side of a transmission along a front-rear direction of a vehicle body; and
an extension tank section that extends forward and outward from the main tank section,
the liquid tank comprises:
a columnar-shaped sub-tank chamber; and
a main tank chamber that extends in a lateral direction from said sub-tank chamber, and
the extension tank section comprises a recessed section adapted to at least partially receive therein or accommodate a portion of the main tank chamber of the liquid tank, wherein:
the main tank chamber comprises a bottom surface, the sub-tank chamber comprises a bottom surface, a bottom region, and a liquid reservoir,
the bottom surface of the main tank chamber is located higher than the bottom surface of the sub-tank chamber, whereby the liquid reservoir is arranged in the bottom region of the sub-tank chamber.

7. A work vehicle comprising:
an engine;
a fuel tank that has a fuel supply inlet and stores engine fuel; and a liquid tank that has a liquid supply inlet and stores purification liquid used in purification of engine exhaust gas,
wherein the liquid tank is associated with the fuel tank so as to be protected by the fuel tank, whereby the liquid tank is not directly exposed to hot air from the engine,
wherein the fuel tank comprises:
  a main tank section that extends along a side of a transmission along a front-rear direction of a vehicle body; and
  an extension tank section that extends forward and outward from the main tank section,
the liquid tank comprises:
  a columnar-shaped sub-tank chamber; and
  a main tank chamber that extends in a lateral direction from said sub-tank chamber, and
the extension tank section comprises a recessed section adapted to at least partially receive therein or accommodate a portion of the main tank chamber of the liquid tank, wherein:
the sub-tank chamber comprises an upper wall, the main tank chamber comprises an upper wall, and the liquid supply inlet comprises a liquid supply edge,
a height level of the upper wall of the sub-tank chamber is equal to or higher than the liquid supply edge of the liquid supply inlet,
a height level of the upper wall of the main tank chamber is lower than that of the upper wall of the sub-tank chamber, and
when the liquid tank is filled with purification liquid, a space allowing expansion of the stored purification liquid remains between the upper wall of the sub-tank chamber and a liquid level.

8. A work vehicle comprising:
an engine;
a fuel tank that has a fuel supply inlet and stores engine fuel; and
a liquid tank that has a liquid supply inlet and stores purification liquid used in purification of engine exhaust gas,
wherein the liquid tank is associated with the fuel tank so as to be protected by the fuel tank, whereby the liquid tank is not directly exposed to hot air from the engine,
wherein the fuel supply inlet and liquid supply inlet are oriented along different directions,
wherein the liquid tank is arranged adjacent to an outer-side side surface of the fuel tank,
wherein the fuel tank comprises:
  a main tank section that extends along a side of a transmission along a front-rear direction of a vehicle body; and
  an extension tank section that extends forward and outward from the main tank section,
wherein the liquid tank comprises:
  a columnar-shaped sub-tank chamber; and
  a main tank chamber that extends in a lateral direction from said sub-tank chamber, and
the extension tank section comprises a recessed section adapted to at least partially receive therein or accommodate a portion of the main tank chamber of the liquid tank, wherein:
the main tank chamber comprises a bottom surface, the sub-tank chamber comprises a bottom surface, a bottom region, and a liquid reservoir,
the bottom surface of the main tank chamber is located higher than the bottom surface of the sub-tank chamber, whereby the liquid reservoir is arranged in the bottom region of the sub-tank chamber.

9. The work vehicle according to claim 8, wherein
the fuel supply inlet is arranged in a front area or region of the extension tank section of the fuel tank, and
the liquid supply inlet is arranged in a front area or region of the main tank chamber of the liquid tank.

10. A work vehicle comprising:
an engine;
a fuel tank that has a fuel supply inlet and stores engine fuel; and
a liquid tank that has a liquid supply inlet and stores purification liquid used in purification of engine exhaust gas,
wherein the liquid tank is associated with the fuel tank so as to be protected by the fuel tank, whereby the liquid tank is not directly exposed to hot air from the engine,
wherein the fuel supply inlet and liquid supply inlet are oriented along different directions,
wherein the liquid tank is arranged adjacent to an outer-side side surface of the fuel tank,
wherein the fuel tank comprises:
  a main tank section that extends along a side of a transmission along a front-rear direction of a vehicle body; and
  an extension tank section that extends forward and outward from the main tank section
wherein the liquid tank comprises:
  a columnar-shaped sub-tank chamber; and
  a main tank chamber that extends in a lateral direction from said sub-tank chamber, and
the extension tank section comprises a recessed section adapted to at least partially receive therein or accommodate a portion of the main tank chamber of the liquid tank, and wherein:
the sub-tank chamber comprises an upper wall, the main tank chamber comprises an upper wall, and the liquid supply inlet comprises a liquid supply edge,
a height level of the upper wall of the sub-tank chamber is equal to or higher than the liquid supply edge of the liquid supply inlet,
a height level of the upper wall of the main tank chamber is lower than that of the upper wall of the sub-tank chamber, and
when the liquid tank is filled with purification liquid, a space allowing expansion of the stored purification liquid remains between the upper wall of the sub-tank chamber and a liquid level.

11. The work vehicle according to claim 10, wherein
the fuel supply inlet is arranged in a front area or region of the extension tank section of the fuel tank, and
the liquid supply inlet is arranged in a front area or region of the main tank chamber of the liquid tank.

* * * * *

UNITED STATES PATENT AND TRADEMARK OFFICE
CERTIFICATE OF CORRECTION

PATENT NO. : 9,556,772 B2
APPLICATION NO. : 14/716056
DATED : January 31, 2017
INVENTOR(S) : Y. Mitobe et al.

It is certified that error appears in the above-identified patent and that said Letters Patent is hereby corrected as shown below:

At Column 9, Line 67 (Claim 2, Line 11) please delete "and" after engine.

At Column 12, Line 32 (Claim 10, Line 20) please insert --,-- after section.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*